C. E. D. USHER.
FLUID DISTRIBUTING PIPE FOR ORE TREATMENT VATS.
APPLICATION FILED DEC. 2, 1908.
965,767.
Patented July 26, 1910.
2 SHEETS—SHEET 1.
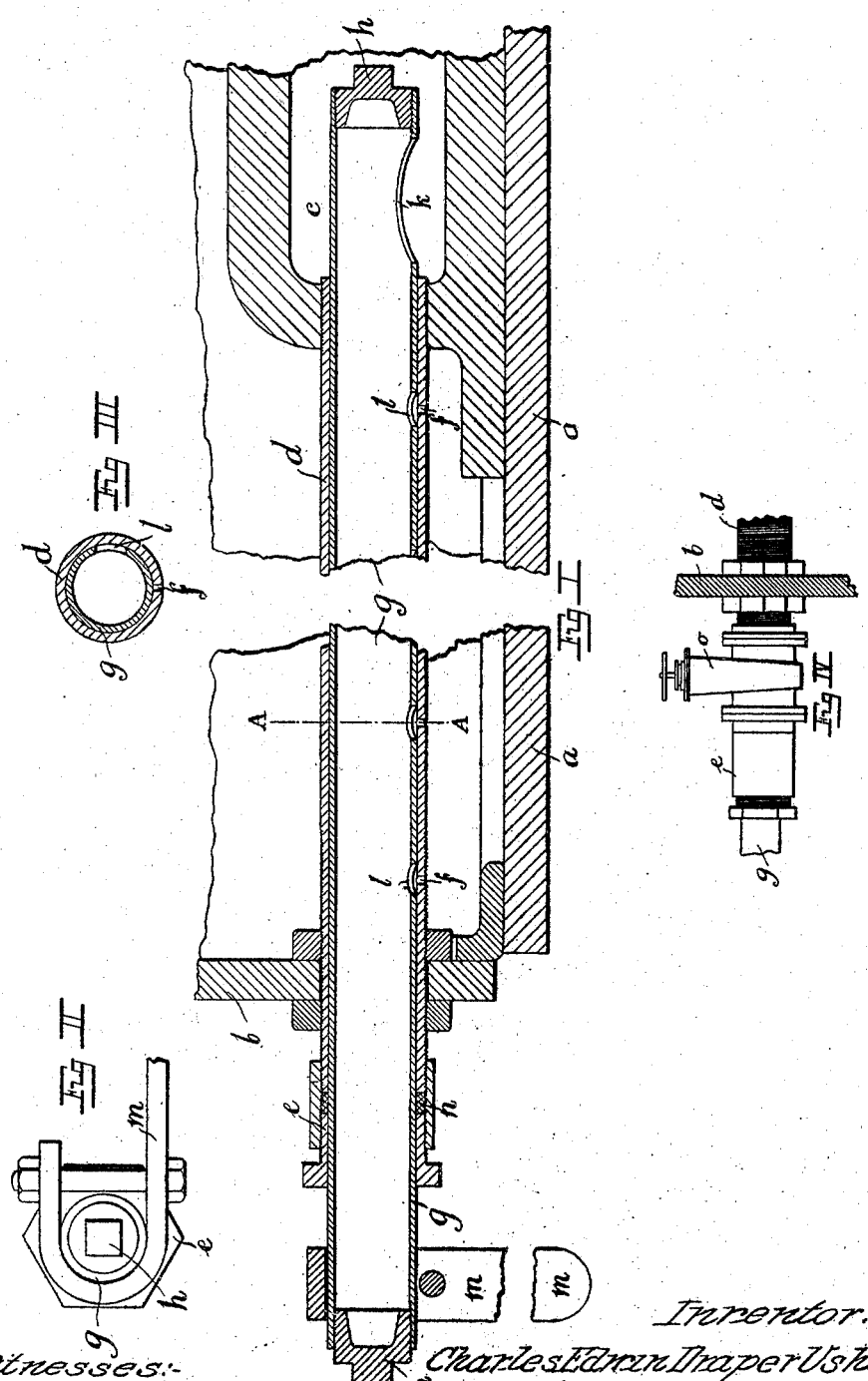

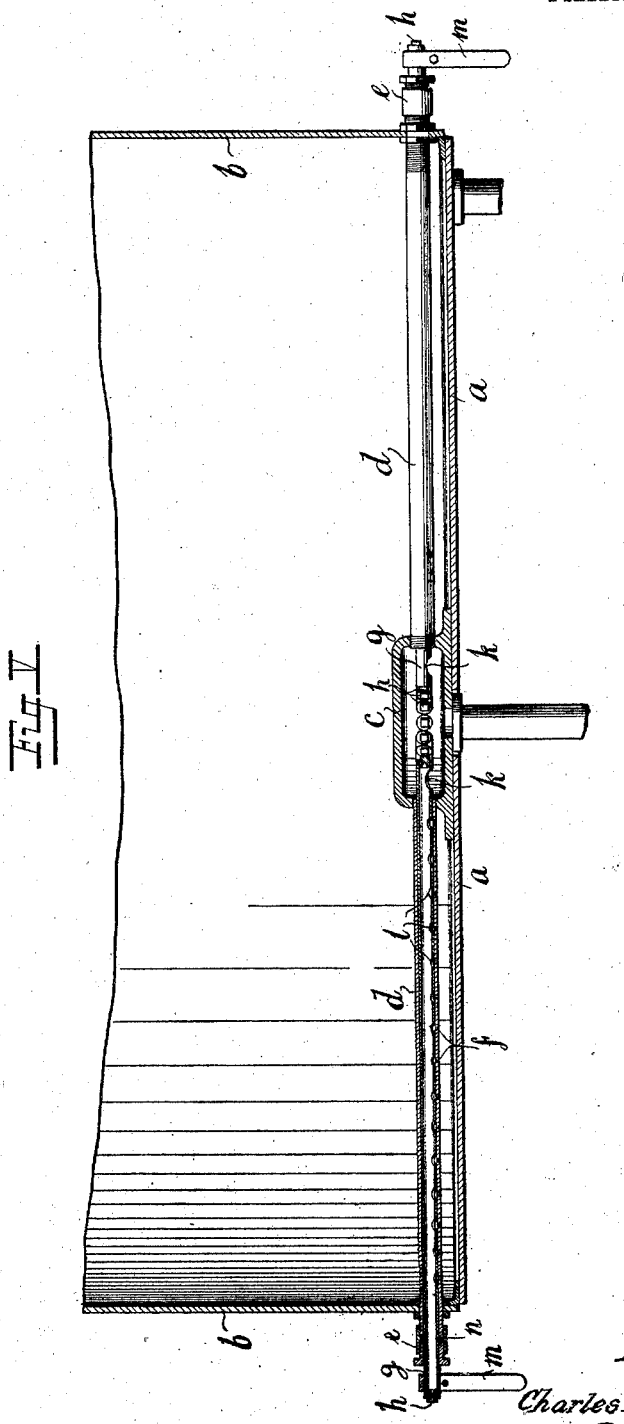

UNITED STATES PATENT OFFICE.

CHARLES EDWIN DRAPER USHER, OF JOHANNESBURG, TRANSVAAL, ASSIGNOR TO ADAIR-USHER PROCESS LIMITED, OF JOHANNESBURG, TRANSVAAL.

FLUID-DISTRIBUTING PIPE FOR ORE-TREATMENT VATS.

965,767.  Specification of Letters Patent.  Patented July 26, 1910.

Application filed December 2, 1908. Serial No. 465,615.

*To all whom it may concern:*

Be it known that I, CHARLES EDWIN DRAPER USHER, assayer, a subject of the King of Great Britain, residing at 33 Walter Mansions, Eloff street, Johannesburg, Transvaal, have invented certain new and useful Improvements in Fluid-Distributing Pipes for Ore-Treatment Vats, of which the following is a specification.

The present invention relates to apparatus suitable for carrying out the several treatment processes in which treatment liquid is injected into the lower part of a mass of comminuted ore or other solid matter contained within a vat.

The purpose in the present instance is to provide against silting up or choking of the pipes by the ore or other solid matter; to enable the supply from any pipe or group of pipes to be regulated as required; and to permit the ready clearing of pipes which may chance to become choked up. The improved apparatus enables the necessary adjustments to be effected during the treatment process, thus permitting the latter to be carried on continuously.

The invention is illustrated in the accompanying drawings in which—

Figure I is a longitudinal section through the lower part of a vat and a pipe fitted therein, Fig. II is an end view of the pipe, Fig. III is a transverse section on the plane A—A Fig. I, and Fig. IV is a side elevation drawn to a reduced scale and showing a modification. Fig. V is a vertical sectional view of a complete device embodying my invention.

The bottom of the vat is indicated by letter $a$, the side thereof by $b$, while $c$ represents a central box or chamber to which liquid is fed for supplying the several distributing pipes $d$. Said pipes $d$ are in this instance disposed radially of the vat, their inner ends being screwed into the chamber $c$, while their outer ends are passed in a water-tight manner through the side $b$ of the vat, and are provided with stuffing boxes $e$. The pipes $d$ are perforated with holes $f$ for the ejection of the treatment liquid, such holes being directed in any desired direction. Fitting snugly but movably within pipes $d$ are the internal pipes $g$. Said pipes $g$ are closed at both ends by plugs $h$ and when in the working position the ends project beyond the ends of pipes $d$. Near to the inner end of each pipe $g$ is formed a large aperture $k$, and along the length of said pipes are formed the holes $l$ positioned to correspond with the holes $f$. The projecting outer ends of pipes $g$ are adapted in any suitable manner to permit their rotation. As shown, handles $m$ are clipped to the end of the pipes, which by their position, afford a ready means of ascertaining whether the apertures $f$ are open or closed. Packing $n$ within the stuffing boxes $e$ forms tight joints between the pipes $d$ and $g$.

When the apparatus is in use, the parts are positioned as shown in Fig. I, and liquid passes freely from the chamber $c$ through apertures $k$ and holes $l$ and $f$ out into the vat. When the treatment process is at an end, or suspended for any purpose, the pipes $g$ are rotated within pipes $d$ so as to close the holes $f$, as seen in Fig. III; such closure being preferably effected before the supply of liquid to chamber $c$ is stopped, in order to prevent the ore granules from depositing within and choking the pipes. Similarly the amount of liquid ejected from some or all of the pipes may be regulated by so turning pipes $d$ as to partially close the holes $f$. In the event of a pipe $g$ becoming clogged or otherwise rendered useless it may be withdrawn bodily from its surrounding pipe $d$ and another one substituted, thus permitting the treatment to be continued without any material stoppage. The aperture $k$ being formed in the side of the pipe $g$, such aperture is closed immediately upon beginning to draw out said pipe, and escape of liquid is prevented except at the moment when the pipe is entirely withdrawn, when the escape may be stopped immediately by the insertion of the new pipe. Escape of liquid may be prevented entirely by inserting a valve $o$, Fig. IV, in the pipe $d$ between the wall of the vat and the stuffing box $e$; such valve being closed as soon as the pipe $g$ has been drawn past it but before its withdrawal from pipe $d$. When a pipe $g$ has been withdrawn it may be readily cleared and made available for further use after removal of the end plugs $h$.

What I claim, and desire to secure by Letters Patent is:—

1. In combination, a vat, fixed perforated distributing pipes therein, each having one end in communication with a source of supply and the other end projecting externally of the vat, loose pipes arranged internally of the fixed pipes and projecting from the open ends thereof, said loose pipes being perforated correspondingly with the fixed pipes and having lateral inlet apertures near to their inner ends, and removable plugs closing the ends of the loose pipes.

2. In combination, a vat, fixed perforated distributing pipes therein in communication with a source of supply, each having one end projecting externally of the vat, and loose pipes arranged internally of the fixed pipes and projecting from the open ends thereof and having perforations corresponding to those of the fixed pipes, and having at their projecting ends means for effecting their rotation.

3. In liquid distributing means for treatment vats, perforated distributing piping extending through the vat at one end and connecting with a source of supply at the other end; and removable closing means for said piping, said closing means serving to regulate the amount of opening of the perforations.

4. In combination, a vat, fixed distributing piping therein, movable piping arranged internally of the fixed piping, and a valve in the fixed piping, for closing the same prior to removal of the removable piping.

5. In combination, a vat having a floor and sides, a fluid chamber arranged centrally of the floor of the vat, fixed perforated distributing pipes extending radially from said chamber through the sides of the vat, and loose pipes arranged internally of the fixed pipes and having perforations corresponding to those of the fixed pipes, the interior of said loose pipes communicating with the fluid chamber, and their outer ends being closed and projecting beyond the outer ends of the fixed pipes.

6. In combination, a vat, fixed perforated distributing pipes therein, each having one end in communication with a source of supply and the other end projecting externally of the vat, loose pipes arranged internally of the fixed pipes and projecting from the open ends thereof, said loose pipes being perforated correspondingly with the fixed pipes and each loose pipe having a lateral inlet aperture near its inner end.

7. In combination, a vat, a chamber for a source of supply located in the vat, fixed perforated distributing piping extending from the outer wall of the vat to said chamber, and movable piping disposed in said fixed piping and having perforations to register with said fixed piping, said movable piping having an opening communicating with said chamber.

8. In combination, a vat, a chamber for a source of supply located in said vat, distributing piping extending from the outer wall of the vat to said chamber and having open ends and perforations, movable perforated piping disposed in said fixed distributing piping and having perforations to register with the perforations of said fixed piping, closures for the ends of said movable piping, said movable piping having an opening communicating with said chamber, and means for rotating or withdrawing said movable piping from said fixed piping.

In testimony whereof I affix my signature in the presence of two witnesses.

CHARLES EDWIN DRAPER USHER.

Witnesses:
J. WARREN VENNING,
WESLEY E. JOHN.